May 31, 1949.  S. YANDO  2,472,038
ULTRA HIGH FREQUENCY METERING DEVICE AND METHOD
Filed Jan. 15, 1945  2 Sheets-Sheet 2
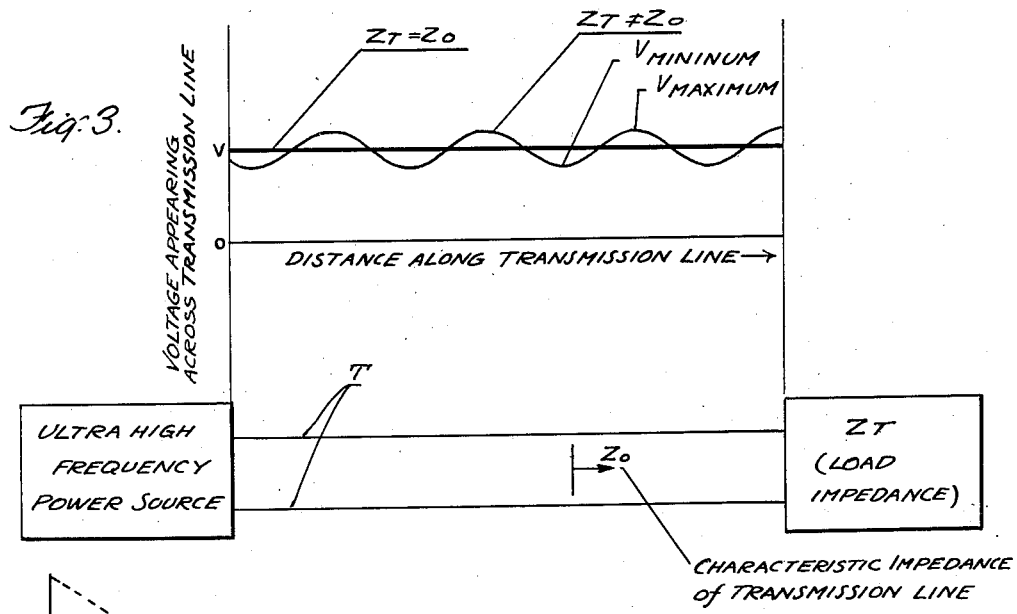
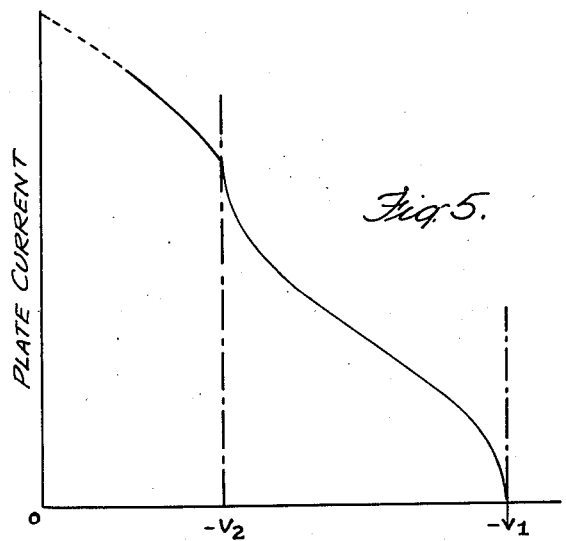
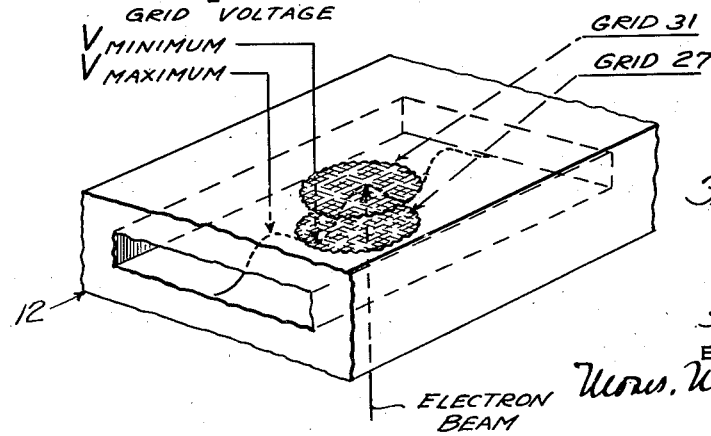
INVENTOR
STEPHEN YANDO
BY
ATTORNEYS Patented May 31, 1949

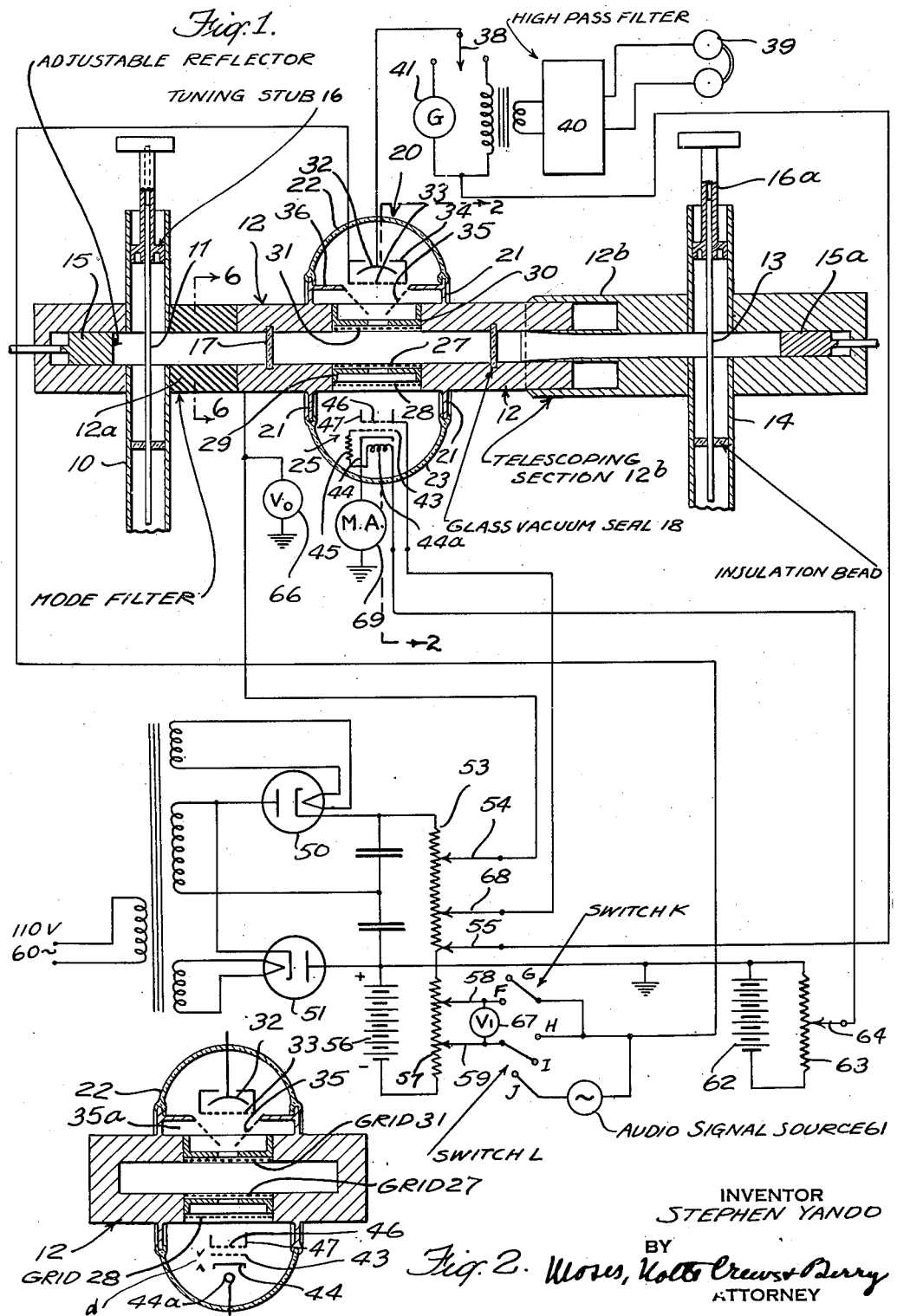

2,472,038

UNITED STATES PATENT OFFICE 2,472,038

ULTRA HIGH FREQUENCY METERING DEVICE AND METHOD

Stephen Yando, Long Island City, N. Y., assignor of fifteen per cent to Edward Pious, New York, N. Y.

Application January 15, 1945, Serial No. 572,868

10 Claims. (Cl. 171—95)

My invention relates to an improved method and apparatus for measuring properties of ultrahigh frequency (U. H. F.) wave power. A principal object of my invention is to measure the voltage of guided passing ultra-high frequency wave power, whereby, the characteristic impedance of the transmission line being known, the power flow in watts is readily calculated. Thus, my invention provides a new watt-meter and method of power measurement on an absolute basis, i. e., without the necessity of previous calibration.

My improved metering device is characterized by its ability to measure U. H. F. power flow into any kind of load impedance, i. e., whether reactive or real, without regard to the magnitude of the power flow and with no appreciable loss thereof.

Further objects of my invention and advantages thereof will be apparent as the description proceeds. My invention will be best understood by reference to the following detailed description taken with the annexed drawings, in which:

Fig. 1 is a view in section of a preferred embodiment adapted to measure the voltage of a guided electromagnetic wave of known configuration and therefore the power carried by the electromagnetic wave;

Fig. 2 is an enlarged view of the detector unit taken on line 2—2 of Fig. 1;

Fig. 3 is a schematic diagram illustrating the voltage relationship in an assumed lossless hollow waveguide or other transmission line;

Fig. 4 is a further schematic view showing the conditions under which Fig. 5 is obtained;

Fig. 5 is a graph showing the characteristics of the plate current of the detector unit;

Fig. 6 is a vertical sectional view on line 6—6 of Fig. 1.

In brief, my improved device as illustrated comprises a hollow waveguide for the U. H. F. power flow which is inserted in the power circuit, having a portion thereof which is sealed off and is capable of being evacuated. An electron gun is disposed in such portion so as to direct an electron beam through the region containing the passing electromagnetic wave together with means for measuring the velocity modulating effect of the U. H. F. electromagnetic field on the electron beam, such measurements resulting in values for the desired voltage. Such values in volts having been obtained, the power flow is readily calculated, as will hereinafter be apparent.

Referring now to Fig. 1, U. H. F. power flows through an input coaxial line 10 to the radiating antenna 11 (which is shown as the central conductor of the coaxial line in the waveguide space), from which point it is propagated into the rectangular waveguide 12 which is preferably chosen and excited so as to afford transmission in the $TE_{0,1}$ mode. A mode filter, 12a is incorporated into the waveguide in the region before the first glass seal to eliminate unwanted modes of transmission. The wave power passing through the guide 12, which has a telescoping section 12b, leaves the same through a receiving antenna 13 forming part of the output coaxial line 14. For the purpose of establishing an impedance match an adjustable reflector 15 is provided at the inlet end of the waveguide 12 and a tuning stub 16 is provided at the terminal of the coaxial line 10. A similar reflector 15a and tuning stub 16a are provided at the output end of the waveguide. Within the waveguide 12 are provided spaced apart seals 17, 18 preferably of glass, which are designed to insure power flow therethrough without reflections at the boundary surfaces and between which the waveguide may be evacuated.

Referring now to Fig. 3, the voltage relations existing on a general, lossless transmission line which is supplying power to a load impedance are shown for the two possible cases, namely, where $Z_t = Z_0$ and where $Z_t \neq Z_0$.

The power flowing through a transmission line to a load impedance may be expressed in terms of the characteristic impedance of the transmission line and the voltages existing across the line. This also applies to the waveguide (which is a special case of a transmission line) used in the embodiment selected to illustrate my invention.

The power flow through the waveguide can be expressed as (a) for $Z_t \neq Z_0$ (imperfect match)

(1) $$\text{Power flow} = \frac{V_{max} V_{min}}{Z_0} \text{ watts}$$

where $V_{max}$ = instantaneous peak valve of the maximum voltage of the standing wave, appearing across the center of the waveguide.

$V_{min}$ = instantaneous peak value of the minimum voltage of the standing wave, appearing across the center of the waveguide.

$$Z_0 = \frac{1508a}{b\sqrt{1-\left(\frac{f_0}{f}\right)^2}}$$

where $a$ = height of waveguide in centimeters (see Fig. 2).

$b$ = width of waveguide in centimeters (see Fig. 2).
$f_0$ = cutoff frequency of waveguide.
$f$ = frequency of U. H. F. power flowing through the waveguide.

(b) For $Z_t = Z_0$ (perfect match)

(2) $$\text{Power flow} = \frac{V^2}{Z_0} \text{ watts}$$

where $V$ = peak instantaneous value of voltage appearing across center of waveguide.
$Z_0$ = as in Equation 1.

Since the characteristic impedance of the waveguide is a function of its geometry and of the U. H. F. frequency, it only remains to measure the latter, whereupon the measurement of $V_{max}$ and $V_{min}$, or $V$ in the special case where $$V_{max} = V_{min} = V$$

will thereupon yield the power flow in watts.

To this end a detector unit denoted generally by 20 is placed in the waveguide between the seals 17 and 18 and consists of cylindrical portions 21, 21 of metal, which may be welded to the waveguide 12, to the upper of which cylinders is attached a glass dome 22 and to the lower of which cylinders is attached a glass dome 23. Within the detector 20 is an electron gun denoted generally by 25 (to be described more particularly hereinafter). Openings in the waveguide 12 are provided with grids 27, 28 attached to a spacer member or ferrule 29 at the waveguide boundary adjacent the cathode, while a ferrule 30 carries a similar grid 31 at the boundary remote from the cathode, grid 28, which is nearer the cathode, serving as an acceleration anode for the electron beam, grids 27 and 31 serving to prevent loss of U. H. F. power while affording a passage for the electron beam across the waveguide.

Further elements of the detector 20 which may be mentioned at this time are the plate or anode 32, a decelerating grid 33 secured on a ferrule 34 and a conically shaped electron trap 35 secured to the cylinder 21 by ring 36. It will be seen from the foregoing that the structure 25 functions as an electron gun to project a beam of electrons across the waveguide to the anode 32, whereas the U. H. F. energy is prevented from escaping from the waveguide due to the grids 27 and 31 which are fine enough for this purpose but allow passage of the electron beam substantially unimpeded. Within the waveguide space between the grids 27 and 31 the electron beam will be velocity modulated and have velocities expressed in electron volts given by (3) $$\text{Electron velocity} = V_0 + \frac{1}{t_2-t_1}\int_{t_1}^{t_2} E_0 \sin \omega t\, dt$$

where $V_0$ = acceleration voltage, $E_0$ = peak instantaneous U. H. F. voltage at the center of the waveguide. Where, as in the assumed case, a standing wave exists, $E_0$ is a function of the distance measured longitudinally of the waveguide. $\omega$ = the angular velocity of vector U. H. F. voltage, $t_1$ = time at which an electron enters the waveguide, $t_2$ = time at which an electron leaves the waveguide.

Equation 3 assumes $E_0$ to be small with respect to $V_0$. However, an analogous situation exists where $E_0$ is an appreciable part of $V_0$, so that the analysis which follows, based upon the assumption of $V_0$ being greatly in excess of $E_0$, will suffice. Equation 3 also neglects the initial electron velocities, which will be dealt with hereinafter.

The second term of Equation 3

$$\frac{1}{t_2-t_1}\int_{t_1}^{t_2} E_0 \sin \omega t\, dt$$

represents the average velocity change the electrons experience upon their passage through the waveguide.

Let $\bar{V}$ be equal to average velocity change the electrons experience upon their passage through the waveguide. An evaluation of the second term of Equation 3 will yield the following:

(4) $$\bar{V} = E_0 \frac{(\cos \omega t_1 - \cos \omega t_2)}{\omega(t_2-t_1)}$$

Since we are interested in $E_0$, the actual U. H. F. voltage existing in the waveguide, we may rewrite (4) as:

(5) $$E_0 = \bar{V}\omega \frac{(t_2-t_1)}{\cos \omega t_1 - \cos \omega t_2} \text{ peak instantaneous volts}$$

$\omega(t_2-t_1)$ = transit angle (i. e., the angle through which the vector, $E_0$, rotates during the transit of an electron through the waveguide).

It will subsequently be shown how Equation 5 will be used to determine the power flow through the waveguide.

For any given transit angle not an integral multiple of $2\pi$ radians, the electrons will leave the waveguide with different velocities dependent upon the time of entry into the waveguide and upon the distance X along the standing wave (see Fig. 3) at which the electrons make their crossing. We may now focus attention upon the electrons with the highest velocity as they pass the grid 31. They will have passed through the waveguide at a position of $V_{max}$, i. e., $E_0 = V_{max}$. Their velocity will be equal to $V_0 + V_1$, where $V_1$ represents the evaluation of Equation 4 between the time limits when it is a maximum. It a potential of $-V_1$ with respect to the cathode is impressed upon grid 33, a decelerating field or barrier potential of magnitude $V_0 + V_1$ will appear in the path of the electron beam. The fastest electrons will then just come to rest at the boundary of grid 33. Grid 35 at waveguide potential, being of conical shape, precludes the possibility of oscillations of the type encountered in velocity modulated reflex tubes. It so forms the decelerating field, that the electrons, after being brought to rest, are deflected into the electron trap space, where their energies are totally dissipated. This trap space is indicated as 35a, Fig. 2. An incremental voltage of $+\Delta V_1$ impressed on grid 33 will allow the fastest electrons to pass through to the plate 32. The progress of electrons from grid 33 to plate 32 is assured by a moderate accelerating electrostatic field between grid 33 and plate 32 (i. e., plate 32 is positive with respect to grid 33). Increasingly positive grid voltages give rise to a grid voltage-plate current characteristic, as seen in Fig. 5. If the electron beam is assumed to be a thin sheet whose length along the waveguide axis is at least a wavelength, the electron beam will exist at all points along the standing wave from $V_{max}$ to $V_{min}$, this situation being illustrated diagrammatically by Fig. 4. Reference to Fig. 5 will indicate that for a grid voltage of $-V_1$, the plate current is 0. For grid voltages more positive, the plate current rises continuously until a grid voltage of $-V_2$ is reached. Precisely at this point the slope of the curve abruptly changes. For our purpose only the section of the curve from $-V_1$ to a little beyond $-V_2$ is of interest. It has been shown that $V_1$ is the maximum value Equation 4 can have for $E_0=V_{max}$. Similarly, it can be shown that $V_2$ is the maximum value Equation 4 can have for $E_0=V_{min}$.

One way of determining the values of $-V_1$ and $-V_2$ will be to apply a small audio frequency signal to the grid 33, which will be amplified in the circuit of plate 32. For all points except $-V_1$ and $-V_2$, a substantially pure tone will appear in the plate circuit. At $-V_1$ and $-V_2$, however, a considerable harmonic distortion will be evidenced in the plate current. If a high pass filter is placed in the plate circuit the fundamental tone will be rejected and the harmonics will be allowed to pass to the headphones or other indicator where they can be detected. In this manner the values $-V_1$ and $-V_2$ may be definitely and precisely fixed and these values measured by a D. C. voltage measuring device. This method of detection is shown in Fig. 1 in which the plate 32 is connected to a switch 38 by which plate 32 may be connected either to the headphones 39 through the high pass filter 40, or to the galvanometer 41, further connections involved being described hereinafter.

It was assumed, for the convenience of presentation, that the width of the electron beam should be at least one wavelength. Except at the very high frequencies, this arrangement would be impractical. Since a practical beam might be less than one wavelength wide, the telescoping section 12b is provided to afford relative motion between the standing wave in the waveguide 12 and the electron beam. This arrangement would allow the location of the electron beam just at a position of $V_{max}$ and then at a position of $V_{min}$ along the standing wave. If, under certain conditions, the width of a practical beam can be considered a negligible fraction of a wavelength, the plate current cut-off would indicate both $-V_1$ and $-V_2$, as the electron beam is first set on $V_{max}$ and then on $V_{min}$.

Investigation has shown that transit angles (x) defined by the relation $$x = 2 \tan \frac{x}{2}$$

are unique. When the negative voltage on grid 33 is set at a value less than the average voltage acting upon the fastest electrons, sharp peaks are evidenced in the plate current precisely when the transit angle satisfies the relation $$x = 2 \tan x/2$$

Such transit angles may be precisely established without the use of costly acceleration voltage metering equipment. The smallest transit angle, not equal to zero, which satisfies the relation $x=2 \tan x/2$, is 8.98 radians. This transit angle is selected, though without discarding the possibility of using larger transit angles which satisfy the relation $x=2 \tan x/2$, because it is small enough to afford a comparatively high U. H. F. average voltage acting upon the electrons but at the same time it is large enough to allow both the waveguide dimensions and the acceleration voltage to be reasonable. For the purpose of establishing the desired transit angle, a galvanometer 41, which should be fairly sensitive, is used in the plate circuit to detect the current peaks.

At this point let us turn back to Equation 5 and derive working formulas for the calculation of power flow through the waveguide.

Equation 5 may be rewritten making the following substitutions:

$$\text{Transit angle} = \omega(t_2 - t_1) = 8.98 \text{ radians}$$
$$\cos \omega t_1 = -\cos \omega t_2 = 0.976$$

(6) $$E_0 = \frac{\overline{V} 8.98}{2(.976)} = 4.6 \overline{V}$$

Equation 6 is not general and applies only when the electron transit angle is 8.98 radians and only when $\overline{V}$ represents the maximum change in electron velocity due to the U. H. F. vector voltage, $E_0$, (i. e., $\overline{V}$ taken as the evaluation of Equation 4, for a given value of $E_0$, taken between the time limits where $\overline{V}$ is a maximum. This automatically became true when we set $\cos \omega t_1 = -\cos \omega t_2 = 0.976$). It is to be noted that when an imperfect load match occurs, there are many values of $\overline{V}$ which will satisfy Equation 6 one such value for each value of $E_0$ along the standing wave.

Where a perfect match occurs (i. e., no reflection) only one value of $E_0$ will exist. Under this condition only one value of $\overline{V}$ will exist which will justify substition of Equation 6.

The value $V_1$ substituted for $\overline{V}$ in Equation 6 will yield a value of $E_0$ which will be equal to $V_{max}$ while the value $V_2$ substituted for $\overline{V}$ in Equation 6 will yield a value of $E_0$ which will be equal to $V_{min}$.

Up to this point it was tacitly assumed, for clarity of presentation, that all the electrons emitted from the cathode have zero initial velocity. Actually, however, electrons emitted from the cathode have initial velocities which follow a Maxwellian distribution. For very small power measurements where the voltages $-V_1$ and $-V_2$ are small, the random unknown initial electron velocities could contribute errors large enough to make the instrument unreliable. To properly compensate for the initial electron velocity I provide a smoother grid 43, which is tied to the cathode proper 44 through high resistance 45, located from the cathode 44 by a distance $d$ such that $d<x_m$, $x_m$ being the distance of the space charge potential minimum from the cathode if no smoother grid were present. The smoother grid 43 is of fine enough mesh to act substantially as the outer shell of the space charge. Thus the smoother grid, by virtue of its structure and proximity to the cathode, serves to produce a very dense space charge on the cathode side which effectively smooths out variations in initial electron velocity. This space charge will remain very dense and unchanged as long as the cathode current does not get so large as to make the relation $d<x_m$ no longer true. The control grid 46 is of fine enough structure to perfectly shield the cathode 44 from the acceleration anode 28 thus making the beam current independent of the acceleration voltage. The electron beam current will solely be determined by the voltage impressed on the control grid 46. The control grid 46 is placed relatively close to the cathode 44 heated by coil 44a, so that only moderately small voltage is necessary on the control grid 46 to produce the required beam current. The velocity of the electron beam is controlled solely by the accelerating voltage on the acceleration anode. The focusing ring 47, at control grid potential, serves to focus the electron beam.

Once the electron beam has been smoothed, it is a simple matter to determine the initial electron velocity and apply the proper corrections. Thus, with no U. H. F. power flowing through the waveguide, grid 33 is biased sufficiently just to cut off current flow to the plate 32, this bias representing the smoothed initial electron velocity which is applied in the form of a zero correction. In other words, with the initial electron velocity smoothed and compensated for, the situation is the same as in the assumed case in which the emitted electrons have zero initial velocity.

The wattmeter in Fig. 1 is shown connected to the power supply circuit which comprises a conventional voltage doubler rectifier circuit employing diodes 50, 51. The rectifier supplies high voltage for the acceleration anode through the potentiometer 53 and movable contact 54 connected to the waveguide 12. Movable contact 55 connected to plate 32 supplies the moderate voltage required therefor. Movable contact 68 connected to the control grid 46 provides the voltage necessary for beam current control.

Battery 56 supplies the voltage required for the grid 33 through the potentiometer 57 having a movable contact 58 serving as the zero control, to be further described, and movable contact 59 by which to apply a regulated voltage to grid 33 through connections to be described. Switches L and K are provided for the circuit changes required during operation. An audio signal source 61 is provided and is to be used as needed. A further battery 62 provides power for the cathode heater, the adjustment of the voltage being secured through potentiometer 63 and movable contact 64 connected to the wire connection shown. Also required are a relatively inaccurate D. C. volt meter 66 for measuring the acceleration voltage, an accurate D. C. volt meter 67 for measuring the voltage across the contacts 58, 59, a milliammeter 69 for measuring the beam current, and, finally, the galvanometer 41, already described, for establishing the electron transit angle and to allow $V_{max}$ and $V_{min}$ to be located within the limits of the electron beam.

Method of operation

Let us assume that it is required to measure the magnitude of power at 3000 megacycles that is flowing into a load impedance $Z_t$.

Suitable waveguide dimensions for this frequency are $a=1$ cm.  $b=10$ cm.  $f_0=1500$ megacycles The characteristic impedance of such a waveguide is $$Z_0 = \frac{1508a}{b\sqrt{1-\left(\frac{f_0}{f}\right)^2}} = \frac{(1508)(1)}{10\sqrt{1-\left(\frac{1500\times 10^6}{3000\times 10^6}\right)^2}} = 174.4 \text{ ohms}$$

To effect an electron transit angle of 8.98 radians at a frequency of 3000 megacycles, an acceleration voltage of approximately 1200 volts is required, as can be seen from the equation:

$$V_0 = \frac{2.83 a^2 \omega^2 10^{-16}}{\theta^2} \text{ volts}$$

where $a$ = height of waveguide (cm.)
$\omega$ = angular velocity of vector U. H. F. voltage (radians/sec.) (as before).
$\theta$ = required transit angle (radians).
$V_0$ = acceleration voltage.

With the above information known, measurements then take place as follows:

With no U. H. F. power flowing through the wattmeter, and with the rectifier in operation, the cathode 44 of the detector is first brought up to operating temperature. The electron beam current is increased to a usable value (say 1 or 2 ma.) indicated by milliammeter 69 by increasing the positive voltage on control grid 46, this being accomplished by varying contactor 68. The acceleration voltage is then brought up to approximately 1200 volts (read on voltmeter 66) by varying contactor 54, to cause an electron beam to be projected across the waveguide. The switch K is put on position denoted F, i. e., connecting contact 58, and switch L is put on position I, i. e., in open position. The contact 58 is then moved until the point of plate current cutoff is reached, as indicated by the galvanometer 41. This operation, which might be termed a zero correction, places an additional bias $-V_c$ (where $V_c$ represents the smoothed initial electron velocity) on grid 33 to compensate for the initial electron velocity. It is to be noted that voltmeter 67 is so connected that it does not read this zero correction bias. The wattmeter is then inserted in series with the load impedance, and the input and output tuning stubs 16 and 16a, and the reflectors 15 and 15a adjusted to give the maximum power to the load impedance. As soon as the U. H. F. power begins to flow through the waveguide, it will be observed that plate current begins to flow as indicated on the galvanometer 41 cut in the plate circuit. To facilitate explanation, it will be assumed that the electron beam is less than a wavelength wide along the standing wave but still a significant part of a wavelength of the standing wave. The telescoping section 12b is moved until a peak is observed in the galvanometer reading, thereby assuring the condition that $V_{max}$ of the standing wave is located within the limits of the electron beam. The acceleration voltage is now varied to either side of the previous setting by moving contact 54 until another peak in the plate current is observed. This peak precisely fixes a transit angle of 8.98 radians. Since the voltmeter 66 indicates an acceleration voltage of approximately 1200 volts, it is certain that the peak obtained does not represent some other transit angle which satisfies the relation $x=2 \tan x/2$. The next nearest transit angle which satisfies the relation is 15.44 radians and this transit angle corresponds to an acceleration voltage of approximately 400 volts.

Switch K is then opened by being put on position G.

Switch L is now placed on contact J thereby cutting in the source of audio frequency voltage 61 to the circuit of grid 33. The operator, by using headphones 39, notes the point of maximum distortion in the plate current as the voltage of grid 33 is varied. Switch L is then moved to contact H and he then observes the reading of voltmeter 67 which gives the value of $-V_1$. Let us for the sake of illustration assume $-V_1$ is measured as 3.00 volts.

The telescoping section 12b is now moved until a minimum current is observed in the galvanometer 41, thereby assuring the condition that $V_{min}$ of the standing wave is located within the limits of the electron beam. Again, by cutting in audio signal 61 and by noting the point of maximum distortion (excluding this time the point of plate current cutoff) in the plate current as the voltage on grid 33 is varied, $-V_2$ (the point of abrupt change in the slope of the plate current-grid voltage characteristic of Fig. 5) is identified and measured directly by voltmeter 67. Let us for the sake of illustration assume $-V_2$ is measured as 2.00 volts.

Now that the voltages $-V_1$ and $-V_2$ have been measured, the power flow through the waveguide can be calculated $$V_{max} = 4.60|V_{-1}| = 4.60(3.00) =$$
13.80 peak instantaneous volts
$$V_{min} = 4.60|V_{-2}| = 4.60(2.00) =$$
9.20 peak instantaneous volts $$\text{Power flow} = \frac{V_{max}V_{min}}{Z_0} = \frac{(13.80)(9.20)}{174.4} = 0.728 \text{ watts}$$

If the waveguide characteristic impedance, $Z_0$, is equal to the load impedance $Z_t$, as by effecting a perfect match, no standing waves will appear in the wave guide, and only one voltage will be measured. In such a case Equation 2 would be used to calculate the power flow.

In my particular embodiment shown, the waveguide was preferred over other types of transmission lines. The waveguide can be conveniently used for frequencies above 1500 megacycles. Below this frequency, however, the waveguide becomes very large and unwieldy. Below 1500 megacycles another embodiment, comprising the detector unit built into an enlarged coaxial line, would be preferred as the more practical arrangement. In the form of the invention illustrated it will be apparent that if desired, the glass seals 17 and 18 may be formed integral with the structure of the detector unit as represented by the glass portions 22 and 23 and the cylindrical elements 21, 21, and the unit so formed inserted into a circular opening in the waveguide 12, with the grids 31 and 27 substantially flush with the surfaces of the waveguide respectively adjacent thereto.

It is to be understood that the invention is not limited in scope to the illustrative form above described in detail, but only as may fairly be construed from the appended claims.

I claim:

1. In the method of determining voltage in an U. H. F. transmission line, the steps which consist in projecting an electron beam of known transit angle and of appreciable width with respect of the wavelength of the U. H. F. voltage to be measured, across a dielectric space containing the guided electromagnetic wave whose voltage is to be measured at the position of maximum voltage along the standing wave, assuming a standing wave does exist, so as to result in the velocity modulation of said beam, applying a measured decelerating voltage to said beam, and noting the point of zero space current to a collector anode in the path of said beam, as the point where correlation exists between the decelerating voltage and the maximum voltage of the standing wave, then projecting said beam through the electromagnetic field at the position of minimum voltage along the standing wave so as to result in the velocity modulation of said beam, applying a measured decelerating voltage, and noting the point of abrupt change in the slope of the space current to the collector anode as the point where correlation exists between the decelerating voltage and the minimum voltage of the standing wave.

2. In an U. H. F. volt meter, a hollow waveguide for the flow of U. H. F. power therethrough, means for placing a portion of said waveguide under vacuum while permitting power flow therethrough, an electron gun disposed so as to cast an electron beam across the electromagnetic field in said evacuated portion, an anode disposed in the path of said beam after said beam traverses said waveguide, to constitute a terminal for said beam, a grid in the path of said beam after it traverses the waveguide but before it reaches the anode, and means to impress a measured potential thereon to vary the space current to said anode, whereby to measure the velocity modulating effect of the U. H. F. power on said beam.

3. In an U. H. F. volt meter, a hollow waveguide for the flow of U. H. F. power therethrough, means for placing a portion of said waveguide under vacuum while permitting power flow therethrough, an electron gun disposed so as to cast an electron beam through the electromagnetic field in said evacuated portion, an anode disposed in the path of said beam after said beam traverses said waveguide, to constitute a terminal for said beam, a grid in the path of said beam after it traverses the waveguide but before it reaches the anode, and means to impress a measured potential thereon to vary the space current to said anode, whereby to measure the modulating effect of the U. H. F. power on said beam, and means for effecting relative movement of a standing wave in said guide with respect to said beam.

4. The volt meter according to claim 3, including a smoothing device for giving all the electrons of the beam substantially the same velocity as they leave the electron gun.

5. A volt meter according to claim 3, in which the means for moving the standing wave with respect to the electron beam comprises means for changing the distance between the electron beam and the load termination.

6. The method of measuring voltage in an U. H. F. transmission line, which consists in projecting an electron beam of known transit angle through the electromagnetic field in a hollow waveguide transmitting U. H. F. power thereby to velocity modulate said beam, modifying the space current produced by said electron beam by biasing a grid in the path thereof, and determining points of the grid voltage-plate current curve corresponding to a maximum and a minimum voltage of an assumed standing wave in said guide by applying an audio frequency voltage to the grid and observing maximum distortion points in the plate current corresponding to said maximum and said minimum voltage.

7. In the method according to claim 6, first adjusting the acceleration voltage of said beam so as to create a transit angle $(x)$ of said electromagnetic field in respect to the travel of an electron across the electromagnetic field in accordance with the equation $x = \tan x/2$, it being assumed that the said acceleration voltage is large with respect to the voltage in said U. H. F. transmission line to be measured.

8. In an U. H. F. volt meter according to claim 2, a conically shaped grid at waveguide potential having its axis centrally disposed in the path of said electron beam, and serving to prevent the backward flow of electrons through the waveguide by deflecting said electrons into a field free trap space.

9. In the method of determining voltage in an U. H. F. transmission line, the steps which consist in projecting an electron beam of known transit angle across a dielectric space containing the guided electromagnetic wave whose voltage is to be measured, thereby to velocity-modulate said beam, decelerating said electron beam so modulated by establishing a grid potential in the path of same and determining values of a curve of grid potential vs. space current through the grid potential so as to reveal the characteristic points thereof serving as measures of the significant voltages existing across the dielectric space of the transmission line.

10. In the method of determining voltage in an U. H. F. transmission line, the steps which consist in projecting across a dielectric space containing the guided electromagnetic wave an electron beam of known transit angle and of narrow cross section relative to the wave-length of the U. H. F. energy being transmitted, thereby to velocity-modulate said beam, decelerating the so modulated electron beam by establishing a grid potential in the path of same, and determining the value of the grid potential necessary to reduce the space current therethrough to zero as a measure of the voltage across the dielectric space of said transmission line.

STEPHEN YANDO.

REFERENCES CITED

The following references are of record in the file of this patent:

UNITED STATES PATENTS

| Number | Name | Date |
| --- | --- | --- |
| 2,106,770 | Southworth et al. | Feb. 1, 1938 |
| 2,243,537 | Ryan | May 27, 1941 |
| 2,373,193 | Fisk | Mar. 27, 1945 |
| 2,406,370 | Hansen | Aug. 27, 1946 |